(No Model.)
J. COCKER.
Let Off Motion for Looms.
No. 238,650. Patented March 8, 1881.
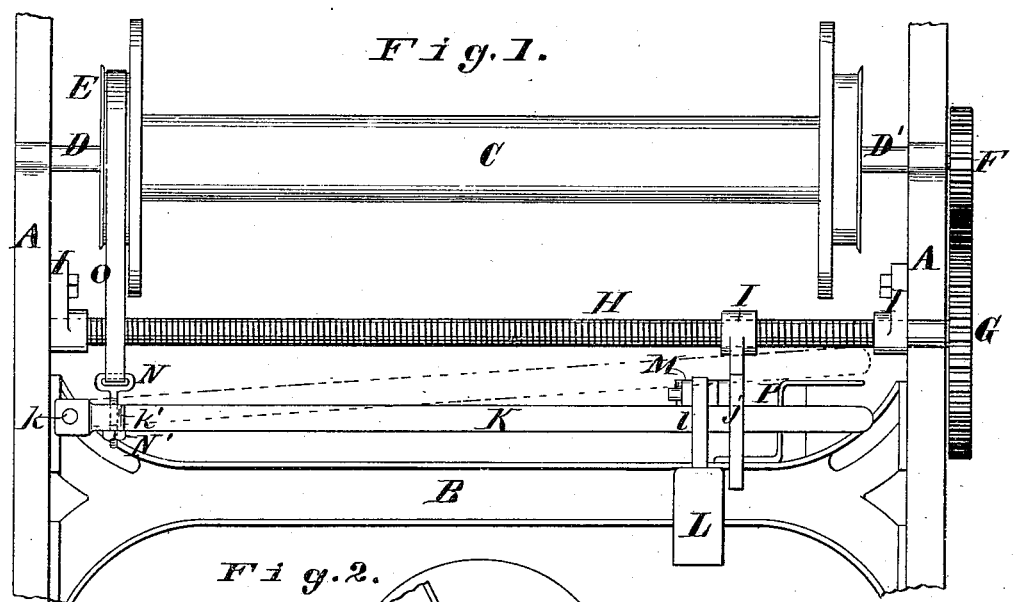
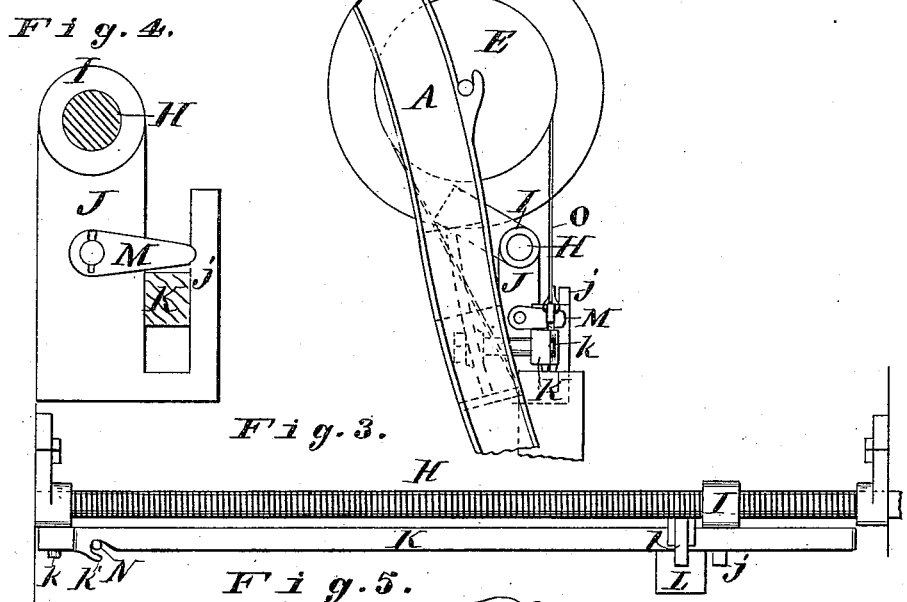
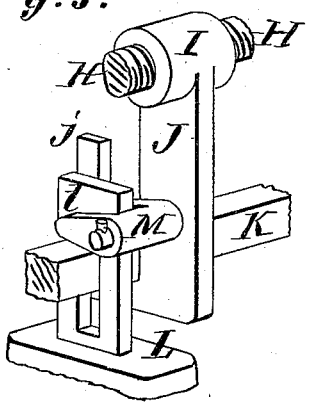
Attest:
Charles Pickles
Geo. H. Knight.
Inventor:
John Cocker
By Knight Bros.
Attys.

UNITED STATES PATENT OFFICE.

JOHN COCKER, OF ST. LOUIS, MISSOURI.

LET-OFF MOTION FOR LOOMS.

SPECIFICATION forming part of Letters Patent No. 238,650, dated March 8, 1881.

Application filed July 6, 1880. (No model.)

*To all whom it may concern:*

Be it known that I, JOHN COCKER, of the city of St. Louis and State of Missouri, have invented a certain new and useful Improvement in Let-Off Motions for Looms, of which the following is a full, clear, and exact description, reference being had to the accompanying drawings, forming part of this specification.

This is a device for varying the friction upon the warp-beam of a loom as the warp is unwound therefrom; and the improvement consists in mechanism to move the weight toward the fulcrum of the brake-lever as the weaving progresses, so that the friction of the brake shall steadily descrease as the purchase of the warp upon the beam decreases, owing to the decrease in diameter of the roll or warp.

In the drawings, Figure 1 is a rear elevation of the letting-off devices, and Fig. 2 is an end elevation thereof. Fig. 3 is a top view of the screw and brake-lever. Fig. 4 is an enlarged detail elevation of the nut, showing the brake-lever and feed-screw in transverse section. Fig. 5 is an enlarged perspective view of the nut, showing its connection with the screw, lever, and weight.

A A show part of the frame of the loom, with a cross-bar, B.

C is the warp-beam, supported by journals D D'. The end of the journal D carries a collar, E, and the end of the journal D' carries a cog-pinion, F. The pinion F engages a cog-wheel, G, upon the screw-shaft H. Thus rotation is communicated to the screw-shaft from the warp-beam journal D'.

I is a nut upon the screw-threaded part of the screw-shaft H. The nut has a pendent arm, J, with a finger, j, embracing the brake-lever K.

L is a weight, hung on the lever K by an eye or staple, l, that is embraced by a jaw-piece or forked toe, M, hinged to the arm J in such a manner that it can be turned over to engage the staple, as shown in the drawings, or turned back to disengage it. The brake-lever is fulcrumed on a pin, k, and has a hook, k', engaging the eyebolt N, connected to one end of the brake-strap O, the other end of the brake-strap being secured to the frame. The eye-bolt has a nut, N', screwing upon it, upon which the brake-lever rests, to draw down the brake-strap and check the rotation of the warp-beam.

P is a bracket on which the end of the brake-lever may be supported to relieve the brake-beam from the brake, as shown in dotted lines in Fig. 1. As a modification I have used a brake on each end of the warp-beam, each brake having its own lever, and the screw H made with a right-hand thread and nut at one end and a left-hand thread and nut at the other end. In this case, as the nuts have less distance to travel, the pitch of the threads must be decreased or the screw geared to turn at slower speed.

I claim as my invention—

The combination of the frame A B, warp-beam C, journals D D', collar E, pinion F, wheel G, screw-shaft H, nut I, arm J, with finger j, brake-lever K, fulcrumed at k, and having a hook, k', weight L, jaw-piece M, eyebolt N, brake O, nut N', and bracket P, all arranged substantially as and for the purpose set forth.

JOHN COCKER.

Witnesses:
SAML. KNIGHT,
GEO. H. KNIGHT.